US012159587B2

(12) United States Patent
Jung et al.

(10) Patent No.: US 12,159,587 B2
(45) Date of Patent: Dec. 3, 2024

(54) SENSING CIRCUIT AND DISPLAY DEVICE INCLUDING THE SAME

(71) Applicant: LG Display Co., Ltd., Seoul (KR)

(72) Inventors: Do Young Jung, Paju-si (KR); Byeong Seong So, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/487,831

(22) Filed: Oct. 16, 2023

(65) Prior Publication Data

US 2024/0257745 A1 Aug. 1, 2024

(30) Foreign Application Priority Data

Jan. 30, 2023 (KR) ........................ 10-2023-0011430

(51) Int. Cl.
*G09G 3/3233* (2016.01)

(52) U.S. Cl.
CPC ... *G09G 3/3233* (2013.01); *G09G 2310/0262* (2013.01); *G09G 2310/08* (2013.01); *G09G 2320/0252* (2013.01); *G09G 2320/045* (2013.01); *G09G 2330/021* (2013.01); *G09G 2330/12* (2013.01)

(58) Field of Classification Search
CPC ......... G09G 3/3233; G09G 2310/0262; G09G 2310/08; G09G 2320/0252; G09G 2320/045; G09G 2330/021; G09G 2330/12
See application file for complete search history.

(56) References Cited

U.S. PATENT DOCUMENTS

| | | | | |
|---|---|---|---|---|
| 10,748,480 B2* | 8/2020 | Zeng | G09G 5/10 | |
| 11,107,407 B2* | 8/2021 | Xu | G09G 3/3266 | |
| 2016/0189630 A1* | 6/2016 | Chang | G09G 3/3291 345/76 | |
| 2018/0061296 A1* | 3/2018 | Shim | G09G 3/3233 | |
| 2018/0144705 A1* | 5/2018 | Lee | G09G 3/3225 | |
| 2019/0325822 A1* | 10/2019 | Li | G09G 3/3233 | |
| 2020/0160794 A1* | 5/2020 | Park | G09G 3/3291 | |
| 2023/0012927 A1* | 1/2023 | Kim | G06F 3/1446 | |

FOREIGN PATENT DOCUMENTS

KR 10-2020-0032508 A 3/2020

* cited by examiner

*Primary Examiner* — Stephen G Sherman
(74) *Attorney, Agent, or Firm* — Fenwick & West LLP

(57) ABSTRACT

A sensing circuit and a display device including the same. The sensing circuit includes: a data driver configured to supply data voltage, which is increased stepwise, to the data line during a sensing time; a gate driver configured to supply gate signals to the gate lines during the sensing time; and an analog-to-digital converter configured to convert a sensing voltage on the sensing line into digital data during the sensing time.

16 Claims, 13 Drawing Sheets

FIG. 6
VGH
VGL
H
L
VGH
VGL
H
L
DT
ST
DATA'
FS2
FS1
FS
T
CS
THR
SCAN
SPRE
SENSE
SAM
Vdata
Vsen

SENSING CIRCUIT AND DISPLAY DEVICE INCLUDING THE SAME

CROSS-REFERENCE TO RELATED APPLICATION

This application claims priority benefit of Korean Patent Application No. 10-2023-0011430, filed on Jan. 30, 2023, the entire contents of which are hereby expressly incorporated herein for all purposes.

BACKGROUND

1. Field

The present disclosure relates to a sensing circuit and more particularly, for example, without limitation, to a sensing circuit including a data driver configured to supply data voltage, which is increased stepwise, to a data line during a sensing time, and a display device including the same.

2. Discussion of Related Art

An organic light-emitting display device an includes an organic light-emitting diode (hereinafter referred to as "OLED") which emits light by itself, and has an advantage that its response speed is fast and its luminous efficiency, luminance, and viewing angle are large. The organic light-emitting display device has a fast response speed, excellent luminous efficiency, luminance, and viewing angle, and has excellent contrast ratio and color reproducibility since it can express black grayscales in full black.

The organic light-emitting display device does not require a backlight unit, and may be implemented on a plastic substrate, a thin glass substrate, or a metal substrate, which is a flexible material. Accordingly, flexible displays may be implemented with organic light-emitting display devices.

In the organic light-emitting display device, each of sub-pixels includes OLEDs and driving elements that drive the OLEDs by supplying currents to the OLEDs according to gate-source voltages. The driving elements may be implemented with a transistor.

The driving elements should be uniform in their electrical characteristics across all sub-pixels, but due to process variations and device characteristics, there may be deviations in the electrical characteristics in the sub-pixels, and the difference in the electrical characteristics across the driving elements may increase over time as the display device is driven. These deviations in the electrical characteristics of the sub-pixels may result in degradation of the image quality of the pixels and shortening of the lifespan of the pixels. To reduce the degradation and extend the lifespan of the sub-pixels, an internal compensation circuit or an external compensation circuit may be used. The internal compensation circuit samples a threshold voltage of a driving element, which varies according to the electrical characteristics of the driving element in the pixel circuit of sub-pixel, and compensates a gate voltage of the driving element by the threshold voltage. The external compensation circuit may compensate for changes in the electrical characteristics of each sub-pixel in real time by sensing the electrical characteristics of the driving element in real time and reflecting the sensing results to modulate the pixel data of the input image in the external circuit of the display panel.

The description provided in the description of the related art section should not be assumed to be prior art merely because it is mentioned in or associated with the description of the related art section. The description of the related art section may include information that describes one or more aspects of the subject technology, and the description in this section does not limit the invention.

SUMMARY

The inventors have recognized that the external compensation circuit uses a source follower circuit to sense the threshold voltage of the driving element at each of the sub-pixels, which requires a long sensing time. For example, approximately 30 [msec] or more may be required to sense the threshold voltage of the driving element in one sub-pixel. For conventional external compensation circuits, it is difficult to secure a time required to sense the threshold voltage of the driving element within a one-frame period. For this reason, the conventional external compensation circuits sense the threshold voltage in the off sequence in which the screen is off in the display device.

The present disclosure has been made in an effort to address aforementioned necessities and/or drawbacks.

The present disclosure provides a display device that includes an external compensation circuit and is capable of reducing the time required for sensing electrical characteristics of each sub-pixel.

It should be noted that objects of the present disclosure are not limited to the above-described objects, and other objects of the present disclosure will be apparent to those skilled in the art from the following descriptions.

A sensing circuit according to one embodiment of the present disclosure includes: a pixel circuit including a data line, a plurality of gate lines, and a driving element connected to a sensing line and configured to drive a light emitting element; a data driver configured to supply data voltage, which is increased stepwise, to the data line during a sensing time: a gate driver configured to supply gate signals to the gate lines during the sensing time; and an analog-to-digital converter configured to convert a sensing voltage on the sensing line into digital data during the sensing time.

The pixel circuit may include: a first switch element connected between the data line and a first node, configured to be turned on in response to a gate high voltage of a first gate signal, and configured to be turned off when a voltage of the first gate signal is a gate low voltage: a second switch element connected between the sensing line and a second node, configured to be turned on in response to the gate high voltage of a second gate signal, and configured to be turned off when the voltage of the second gate signal is the gate low voltage; and a capacitor connected between the first node and the second node. The driving element may include a first electrode to which a pixel driving voltage is applied, a gate electrode connected to the first node, and a second electrode connected to the second node. The light emitting element may include an anode electrode connected to the second node and a cathode electrode to which a cathode voltage is applied.

The first gate signal may include a pulse of the gate high voltage generated during the sensing time. The second gate signal may include a pulse of the gate high voltage generated during the sensing time. During the sensing time, a voltage of the second gate signal may rise to the gate high voltage after the voltage of the first gate signal is inverted to the gate high voltage. During the sensing time, the voltage of the first gate signal may lower to the gate low voltage after the voltage of the second gate signal lowers to the gate low voltage.

The sensing circuit may further include: a third switch element connected between the sensing line and a constant voltage node to which a reference voltage is applied, configured to be turned on in response to a high voltage of a third gate signal, and configured to be turned off when the voltage of the third gate signal is a low voltage; and a fourth switch element connected between the sensing line and the analog-to-digital converter, configured to be turned on in response to a high voltage of a fourth gate signal, and configured to be turned off when the voltage of the fourth gate signal is a low voltage. The third switch element may be turned on prior to the second switch element.

The third gate signal may include a pulse of the high voltage generated during the sensing time. The fourth gate signal may include a plurality of pulses of the high voltage generated during the sensing time. The voltage of the third gate signal may rise to the high voltage when the voltage of the first gate signal changes to the gate high voltage, and lower to the low voltage when the voltage of the second gate signal changes to the gate low voltage. The pulse of the fourth gate signal may be repeatedly generated while the voltages of the first and second gate signals remain at the gate high voltage.

The data voltage may include a plurality of pulses whose voltage is increased stepwise by a preset voltage step difference during the sensing time. A pulse of the fourth gate signal may be generated subsequent to the pulse of the data voltage, and the pulse of the fourth gate signal and the pulse of the data voltage are alternated.

The sensing time may include a coarse sensing time and a fine sensing time. The data voltage may include a plurality of pulses whose voltage is increased stepwise by a first voltage step difference during the coarse sensing time. The data voltage may include a plurality of pulses whose voltage is increased stepwise by a second voltage step difference less than the first voltage step difference during the fine sensing time.

A threshold voltage of the driving element may be sensed when the sensing voltage is greater than a predetermined threshold value. A pulse voltage of the data voltage applied to the data line is set to an upper limit voltage of a fine sensing voltage range applicable to the fine sensing time when the sensing voltage is greater than the preset threshold. The data voltage may include pulses whose voltage is increased stepwise by the second voltage step difference within the fine sensing voltage range during the fine sensing time.

The fine sensing time may include at least a first fine sensing time and a second fine sensing time. The data voltage may include a plurality of pulses whose voltage is increased stepwise by a first voltage step difference during the coarse sensing time. The data voltage may include a plurality of pulses whose voltage is increased stepwise by a second voltage step difference less than the first voltage step difference during the first fine sensing time. The data voltage may include a plurality of pulses whose voltage is increased stepwise by a third voltage step difference less than the second voltage step difference during the second fine sensing time.

A display device according to one embodiment of the present disclosure includes: a display panel on which a plurality of data lines, a plurality of gate lines, a plurality of power lines, a plurality of sensing lines, and a plurality of pixel circuits including a drive element for driving a light emitting element are arranged; a data driver configured to supply data voltages, which is increased stepwise, to the data lines during a sensing time and to convert pixel data of an input image into data voltages for outputting the same during a display time: a gate driver configured to supply gate signals to the gate lines during the sensing time and the display time; and a sensing circuit including an analog-to-digital converter that converts sensing voltages on the sensing lines into digital data during the sensing time.

According to one embodiment of the present disclosure, a sensing method of display device on which a plurality of data lines, a plurality of gate lines, and a plurality of pixel circuits including a drive element for driving a light emitting element are arranged, is provided, the method comprising: supplying data voltages, which is increased stepwise, to data lines during a sensing time; and supplying gate signals to gate lines during the sensing time.

According to the present disclosure, the sensing time may be reduced by sensing the threshold voltage of the driving element of each of the sub-pixels while varying the voltage of the data voltage during the sensing time in an external compensation circuit that senses the threshold voltage of the driving element of the sub-pixels and reflects the sensing result to the pixel data.

According to the present disclosure, the threshold voltage of the driving element arranged in each of the sub-pixels may be sensed at high speed, resulting in the threshold voltage being sensed within the display time.

According to the present disclosure, low-power driving of the display device is possible since power required for sensing is reduced, and high-speed sensing is possible even if the resolution of the display device is increased and the driving speed thereof is increased.

Effects which can be achieved by the present disclosure are not limited to the above-mentioned effects. That is, other objects that are not mentioned may be obviously understood by those skilled in the art to which the present disclosure pertains from the following description.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

Figure 1:
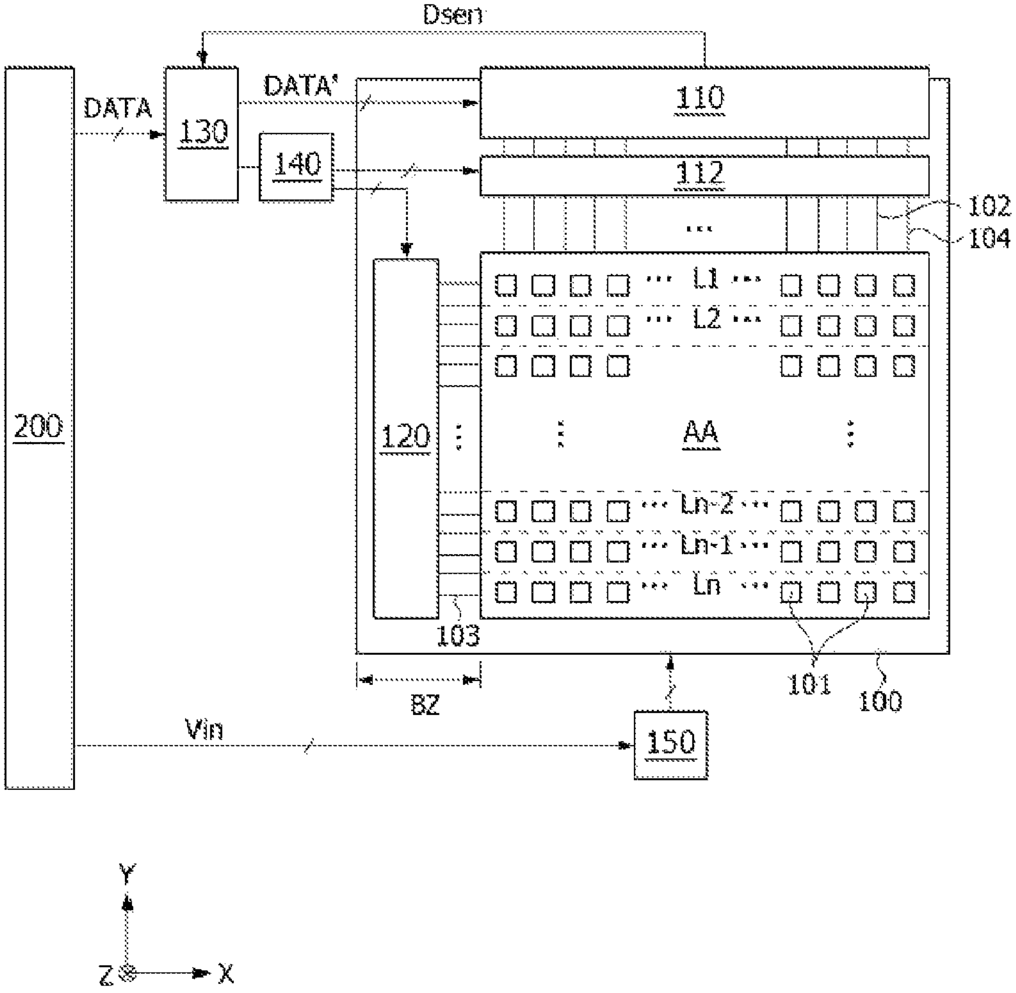
FIG. 1 is a block diagram illustrating a display device according to one exemplary embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION OF EXEMPLARY EMBODIMENTS

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, areas, ratios, angles, numbers, and the like illustrated in the accompanying drawings for describing the embodiments of the present disclosure may be merely examples, and the present disclosure is not limited thereto. Like reference numerals generally denote like elements throughout the present specification. Further, in describing the present disclosure, detailed descriptions of known related technologies may be omitted to avoid or may be briefly provided unnecessarily obscuring the subject matter of the present disclosure.

The terms such as “include,” “have,” “comprise,” “contain,” “constitute,” “make up of,” “formed of,” and “consist of” used herein are generally intended to allow other components to be added unless the terms are used with the term such as “only.” Any references to singular may include plural unless expressly stated otherwise.

Components are interpreted to include an ordinary error range or an ordinary tolerance range even if not expressly stated.

When a positional or interconnected relationship is described between two components, such as “on top of,” “above,” “below,” “under”, “beside”, “beneath”, “near”, “close to,” “adjacent to”, “on a side of”, “next to,” “connect or couple with,” “crossing,” “intersecting,” or the like, one or more other components may be interposed between them, unless the term such as “immediately” or “directly” is used.

Spatially relative terms, such as “under,” “below,” “beneath”, “lower,” “over,” “upper” and the like, may be used herein for ease of description to describe one element or feature’s relationship to another element(s) or feature(s) as illustrated in the figures. It will be understood that the spatially relative terms can encompass different orientations of an element in use or operation in addition to the orientation depicted in the figures. For example, if an element in the figures is inverted, elements described as “below” or “beneath” other elements or features would then be oriented “over” the other elements or features. Thus, the exemplary term “below” can encompass both an orientation of below and above. Similarly, the exemplary term “above” or “over” can encompass both an orientation of “above” and “below”.

When a temporal antecedent relationship is described, such as “after”, “following”, “next to”, “before”, or the like, it may not be continuous on a time base unless “immediately” or “directly” is used.

The terms “first,” “second,” “A,” “B,” “(a),” “(b),” and the like may be used to distinguish components from each other, but the functions or structures of the components are not limited by ordinal numbers or component names in front of the components. Accordingly, as used herein, a first element may be a second element within the technical idea of the present disclosure.

In addition, terms, such as first, second, A, B, (a), (b), or the like may be used herein when describing components of the present disclosure. Each of these terminologies is not used to define an essence, order, or sequence of a corresponding component but used merely to distinguish the corresponding component from other components. In the case that it is described that a certain structural element or layer is “connected”, “coupled”, “adhered” or “joined” to another structural element or layer, it is typically interpreted that another structural element or layer may be “connected”, “coupled”, “adhered” or “joined” to the structural element or layer directly or indirectly.

The term “at least one” should be understood as including any and all combinations of one or more of the associated listed items. For example, the meaning of “at least one of a first item, a second item, and a third item” denotes the combination of all items proposed from two or more of the first item, the second item, and the third item as well as the first item, the second item, or the third item.

A term “device” used herein may refer to a display device including a display panel and a driver for driving the display panel. Examples of the display device may include a light emitting element EL, and the like. In addition, examples of the device may include a notebook computer, a television, a computer monitor, an automotive device, a wearable device, and an automotive equipment device, and a set electronic device (or apparatus) or a set device (or apparatus), for example, a mobile electronic device such as a smartphone or an electronic pad, which are complete products or final products respectively including EL and the like, but embodiments of the present disclosure are not limited thereto.

A size and a thickness of each component illustrated in the drawing are illustrated for convenience of description, and the present disclosure is not limited to the size and the thickness of the component illustrated.

The following embodiments can be partially or entirely bonded to or combined with each other and can be linked and operated in technically various ways. The embodiments can be carried out independently of or in association with each other.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein.

In a display device of the present disclosure, a pixel circuit and a gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like. The oxide semiconductor may be made of a metal oxide such as zinc (Zn), indium (In), gallium (Ga), tin (Sn), and titanium (Ti) or a combination of a metal such as zinc (Zn), indium (In), gallium (Ga), tin (Sn), or titanium (Ti) and its oxide. Specifically, the oxide semiconductor may include zinc oxide (ZnO), zinc-tin oxide (ZTO), zinc-indium oxide (ZIO), indium oxide (InO), titanium oxide (TiO), indium-gallium-zinc oxide (IGZO), indium-zinc-tin oxide (IZTO), indium zinc oxide (IZO), indium gallium tin oxide (IGTO), and indium gallium oxide (IGO), but is not limited thereto. Further, each of the transistors may be implemented as a p-channel TFT or an n-channel TFT.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In case of an n-channel transistor, a gate-on voltage may be a gate high voltage VGH, and a gate-off voltage may be a gate low voltage VGL. In case of a p-channel transistor, a gate-on voltage may be a gate low voltage VGL, and a gate-off voltage may be a gate high voltage VGH.

Hereinafter, various embodiments of the present disclosure will be described in detail with reference to the accompanying drawings.

FIG. 1 is a block diagram illustrating a display device according to one exemplary embodiment of the present disclosure. All the components of each display device according to all embodiments of the present disclosure are operatively coupled and configured.

Referring to FIG. 1, the display device according to an exemplary embodiment of the present disclosure includes a display panel 100, a display panel driving circuit for writing pixel data to pixels of the display panel 100, a power supply 150 for generating power necessary for driving the pixels and the display panel driving circuit, and the like.

The display panel 100 may be a panel having a rectangular structure with a length in the X-axis direction, a width in the Y-axis direction, and a thickness in the Z-axis direction, without being limited thereto. As an example, the display panel 100 may be a panel having a rectangular structure with a length in the Y-axis direction, a width in the X-axis direction. As another example, the display panel 100 may be a panel having a structure of any shape such as a square shape, a circle shape, an oval shape, etc. The display panel 100 may include a display area AA provided on a substrate (not shown) and non-display areas BZ disposed in the vicinity of the display area AA or surrounding the display area AA. The substrate may include glass, plastic, or a flexible polymer film. For example, the flexible polymer film may be made of any one of polyimide (PI), polyethylene terephthalate (PET), acrylonitrile-butadiene-styrene copolymer (ABS), polymethyl methacrylate (PMMA), polyethylene naphthalate (PEN), polycarbonate (PC), polyethersulfone (PES), polyarylate (PAR), polysulfone (PSF), cyclic olefin copolymer (COC), triacetylcellulose (TAC) film, polyvinyl alcohol (PVA) film, and polystyrene (PS), and the present disclosure is not limited thereto.

The display area AA of the display panel 100 includes a pixel array for displaying an input image thereon. The pixel array includes a plurality of data lines 102, a plurality of gate lines 103 intersected with the data lines 102, a plurality of sensing lines 104, and pixels arranged in a matrix form. The display panel 100 may further include power lines (e.g., commonly) connected to the pixels. The power lines may be commonly connected to constant voltage nodes of pixel circuits and supply a voltage required for driving the pixels 101 to the pixels 101.

The data lines 102 are arranged in the form of long wires along the Y-axis direction of the display panel 100 and are electrically connected to data channel terminals of a data driver 110. The sensing lines 104 are arranged on the display panel 100 in parallel with data lines 102 and may be connected to sub-pixels and to sensing channel terminals of the data driver 110. The gate lines 103 are arranged in the form of long wires along the X-axis direction of the display panel 100 to intersect the data lines 102 and are electrically connected to output terminals of the gate driver 110.

Each of the pixels 101 may be divided into a red sub-pixel, a green sub-pixel, and a blue sub-pixel for color implementation. Alternatively, in addition to the red sub-pixel, the green sub-pixel, and the blue sub-pixel for color implementation, each of the pixels may further include a white sub-pixel. Colors of the sub-pixels are not limited thereto, and may be any other color such as cyan, magenta, yellow, etc. As an example, each of the sub-pixels includes a pixel circuit for driving a light emitting element. Each of the pixel circuits is connected to the data lines, the gate lines, and/or the power lines. The pixel circuits may be implemented as a circuit shown in FIG. 3, but is not limited thereto.

The pixels may be arranged as real color pixels and/or pentile pixels, etc. A pentile pixel may realize a higher resolution than the real color pixel by driving two sub-pixels having different colors as one pixel 101 by using a preset pixel rendering algorithm. The pixel rendering algorithm may compensate for insufficient color representation in each pixel with the color of light emitted from its adjacent pixel.

The pixel array includes a plurality of pixel lines L1 to Ln. Each of the pixel lines L1 to Ln includes one line of pixels arranged along the line direction (e.g., X-axis direction) in the pixel array of the display panel 100. As an example, the pixels arranged in one pixel line share the same gate lines 103. The sub-pixels arranged, for example, in the column direction Y along the data line direction share the same data line 102. As an example, one horizontal period is a time obtained by dividing one frame period by the total number of pixel lines L1 to Ln, without being limited thereto.

The display panel 100 may be implemented with a non-transmissive display panel or a transmissive display panel. The transmissive display panel may be applied to a transparent display device made of transparent materials in which an image is displayed on a screen and an actual object in the background is visible. For example, the transparent materials may include Polyethylene terephthalate (PET), Polyethylene naphthalate (PEN), Poly(methyl methacrylate) (PMMA), Cyclo-olefin polymers (COP), cyclo-olefin copolymers (COC) and the like, and the present disclosure is not limited thereto. In addition, the display panel 100 may be manufactured as a flexible display panel or a non-flexible display panel.

The power supply 150 may adjust the level of a direct current voltage Vin inputted from a host system 200 to output a first voltage V1 necessary to drive the pixel array of the display panel 100 and the display panel driving circuit. The power supply 150 may include a direct current to direct current converter (DC-DC converter). The DC-DC converter may include a charge pump, a regulator, a buck converter, a boost converter, and the like. The power supply 150 may output a constant voltage (or direct current voltage), such as a gamma reference voltage, a gate high voltage, a gate low voltage, a pixel driving voltage, a cathode voltage, a reference voltage, etc., through the use of the DC-DC converter. The gamma reference voltage is supplied to the data driver 110. A dynamic range of the data voltage outputted from the data driver 110 is determined by a voltage range of the gamma reference voltage. The dynamic range of the data voltage may have a voltage range between the uppermost grayscale voltage and the lowermost grayscale voltage. A voltage level of the data voltage is selected by a gray scale value of the pixel data.

The gate high voltage and the gate low voltage are supplied to a level shifter 140 and the gate driver 120. The constant voltages such as the pixel driving voltage, the cathode voltage, and the reference voltage are supplied to the pixels 101 via the power lines commonly connected to the pixels 101. As another example, the pixel driving voltage may be outputted from a main power source of the host system 200 and supplied to the display panel 100. In this case, the power supply 150 does not need to output the pixel driving voltage.

The display panel driving circuit writes the pixel data of the input image to the pixels of the display panel 100 under the control of the timing controller 130. The display panel driving circuit includes the data driver 110, the gate driver 120, and a sensing circuit. The display panel driving circuit may further include a de-multiplexer array 112 disposed between the data driver 110 and the data lines 102, without being limited thereto.

The sensing circuit provides digital data (hereinafter referred to as "sensing data") to the timing controller 130 corresponding to a sensing voltage obtained from the sub-pixels through the sensing line 104 connected to the sub-pixels.

The de-multiplexer array 112 sequentially supplies data voltage outputted from data channels of the data driver 110 to the data lines 102 using a plurality of de-multiplexers DEMUX. Each of the de-multiplexers may include a number of switch elements disposed, for example, on the display panel 100. When the de-multiplexers are disposed between the output terminals of the data driver 110 and the data lines 102, the number of channels of the data driver 110 may be reduced. However, the present disclosure is not limited thereto. Alternatively, the de-multiplexer array 112 may be omitted.

The display panel driving circuit may further include a touch sensor driver for driving touch sensors. The touch sensor driver is omitted from FIG. 1. The data driver 110 and the touch sensor driver may be integrated into one drive IC (Integrated Circuit). In a mobile terminal or a wearable terminal, the timing controller 130, the level shifter 140, the data driver 110, the touch sensor driver, and the like may be integrated into one drive IC (DIC), without being limited thereto. The touch sensor driver may be omitted.

The data driver 110 receives the pixel data of the input image received as a digital signal from the timing controller 130 and outputs the data voltage. The data driver 110 includes data channels that are electrically connected to the data lines 102 and that output the data voltage Vdata, and sensing channels that are electrically connected to the sensing lines 104 and that receive sensing voltage.

The data channels of the data driver 110 convert the pixel data DATA' of the input image into gamma compensation voltage using a digital to analog converter (hereinafter referred to as "DAC") and output the data voltage of the pixel data at each frame period in a normal driving mode. The gamma reference voltage is divided by a voltage divider circuit into a gamma compensation voltage for each grayscale. The gamma compensation voltage for each grayscale is provided to the DAC in the data driver 110. The data voltage is outputted via an output buffer from each of the channels of the data driver 110.

The sensing channels of the data drive 110 include an analog to digital converter (ADC). The sensing channels convert the sensing voltage received through the sensing lines 104 into digital data by using the ADC and output sensing data Dsen. For example, the sensing data Dsen is sent to the timing controller 130.

The gate driver 120 may be formed in the circuit layer CIR on the display panel 100 together with the TFT array of the pixel array and the wirings, or may be disposed in at least one of left and right non-display areas BZ of the display panel 100 outside the display area AA, or at least a portion thereof may be disposed within the display area AA in which an input image is reproduced. Embodiments are not limited thereto. As an example, the gate driving circuit 120 may be connected to the display panel 100 in a tape automated bonding (TAB) type, or connected to the display panel 100 in a chip on glass (COG) type or a chip on panel (COP) type, or connected to the display panel 100 in a chip on film (COF) type.

The gate driver 120 may be disposed in the non-display areas BZ on both sides of the display panel 100 with the display area AA of the display panel interposed therebetween, and may supply gate pulses from both sides of the gate lines 103 in a double feeding method. In another embodiment, the gate driver 120 may be disposed in at least one side of the left and right non-display areas BZ of the display panel 100 to supply gate signals to the gate lines 103 in a single feeding method. The gate driver 120 sequentially outputs pulses of the gate signals to the gate lines 103 under the control of the timing controller 130. The gate driver 120 may sequentially supply the gate signals to the gate lines 103 by shifting the pulses of the gate signals using the shift registers. The gate driver 120 may include a plurality of shift registers that output the pulses of the gate signals.

The timing controller 130 receives from the host system 200 digital data of the input image and timing signals synchronized with this data. The timing signal may include a vertical synchronization signal Vsync, a horizontal synchronization signal Hsync, a clock CLK, and a data enable signal DE, etc. Because a vertical period and a horizontal period may be known by counting the data enable signal DE, the vertical synchronization signal Vsync and the horizontal synchronization signal Hsync may be omitted. The horizontal synchronization signal Hsync and the data enable signal DE have a period of one horizontal period (1H).

The timing controller 130 generates a data timing control signal for controlling the operation timing of the data driver 110, a MUX control signal for controlling the operation timing of the de-multiplexer array 112, and/or a gate timing control signal for controlling the operation timing of the gate driver 120 based on the timing signals Vsync, Hsync, and DE received from the host system 200. The timing controller 130 synchronizes the data driver 110, the de-multiplexer array 112, and/or the gate driver 120 by controlling the operation timing of the display panel driving circuit.

The MUX control signal and the gate timing control signal outputted from timing controller 130 may be inputted to the de-multiplexer array 112 and the shift registers in the gate driver 120 through the level shifter 140, without being limited thereto. The level shifter 140 may convert a voltage of the MUX control signal received from the timing controller 130 to a swing width between the gate high voltage and the gate low voltage and supply it to the de-multiplexer array 112. The level shifter 140 may receive the gate timing control signal and generate a start pulse and a shift clock that swing between the gate high voltage and the gate low voltage to provide them to the gate driver 120. Embodiments are not limited thereto. As an example, the level shifter 140 may be omitted according to the design. In this case, the MUX control signal and/or the gate timing control signal outputted from timing controller 130 may be inputted to the de-multiplexer array 112 and the gate driver 120 directly.

A display mode (or display time) in which the pixel data of the input image is written to the pixels may be divided into normal driving mode and low-speed driving mode. In the low-speed driving mode, power consumption of the display panel 100 and the display panel driving circuitry may be reduced, so that the display device may be driven at low power. The low-speed driving mode may be set to reduce the power consumption of the display device when the input images do not change for a predetermined number of frames as a result of analyzing the input images. In the low-speed driving mode, the power consumption in the display panel driving circuit and the display panel 100 may be reduced by lowering a frame frequency at which the pixel data is written to the pixels, that is, a refresh rate, when still images are inputted for a predetermined time or longer. The low-speed driving mode is not limited to a case where the still images are inputted. For example, when the display device operates in a standby mode or when a user command or an input image is not inputted to the display panel driving circuit for a predetermined time or longer, the display panel driving circuit may operate in the low-speed driving mode. Low-speed driving mode can help conserve energy by reducing the refresh rate of the display. This is particularly useful in battery-powered devices, such as smartphones, tablets, and laptops, where energy efficiency is crucial for prolonging battery life.

The timing controller 130 reduces a frequency of refresh frames at which the pixel data is written to the pixels in the low-speed driving mode, compared to the normal driving mode. For example, the frequency of the refresh frames at which the pixel data is written to the pixels in the normal driving mode may be any one of frequencies greater than 60 Hz, such as 60 Hz, 120 Hz, 144 Hz, 240 Hz, and the refresh frame frequency in the low-speed driving mode may be a lower frequency than that in the normal driving mode. The timing controller 130 may set multiple hold frames after the refresh frames in order to lower the refresh rate of the pixels in the low-speed driving mode, thereby lowering the driving frequency of the display panel driving circuit and the pixels. In the refresh frames, the pixel data of the input image is written to the pixels. In the hold frames, the sub-pixels hold the data voltage stored in a capacitor in a previous refresh frame.

The host system 200 may include a main board of any of a television system, a set-top box, a navigation system, a personal computer (PC), an in-vehicle system, a mobile terminal, a wearable terminal and the like. The host system may scale an image signal from a video source to match the resolution of the display panel 100, and may transmit it to the timing controller 130 together with the timing signal.

The display panel driving circuit writes the pixel data of the input image into the pixels 101 by scanning the pixels in the display mode under the control of the timing controller 130. In the display mode, the input image is reproduced on the display area AA. The sensing circuit sequentially senses the threshold voltages of the driving elements DR in all the sub-pixels by sensing the sub-pixels in the display area AA line by line in the sensing mode.

Figure 2:
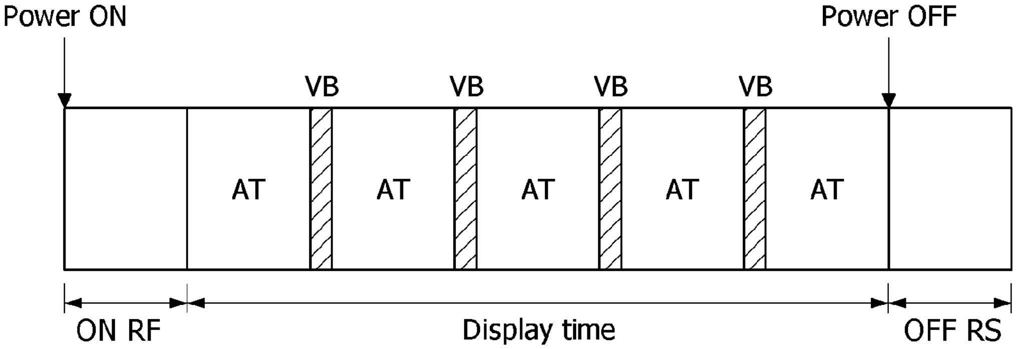
FIG. 2 is a diagram illustrating a time of entering a sensing mode in a driving sequence of a display device according to the embodiment of the present disclosure.

The display device may enter the sensing mode in at least one of the following sequences: a Power ON sequence in which power is applied to the display device, a Vertical Blank time VB within the display time, and a Power OFF sequence in which the power-off switch of the display device is turned on, as shown in FIG. 2. The vertical blank time VB is a blank period, excluding an active period AT, during which the pixel data of the input image is written to the pixels within a one-frame period. During the vertical blank time VB, no pixel data is inputted to the data driver 110 and no pixel data is written to the sub-pixels. During the active period AT, the pixel data DATA' is inputted to the data driver 110, and the data voltage outputted from the data driver 110 is charged to the sub-pixels so that the pixel data is written to the sub-pixels.

In the Power OFF sequence, the sensing circuit is further driven for a predetermined period of time after the power-off switch is turned on to sense the threshold voltage of the driving element in each of the sub-pixels, and then stops its driving when the power is cut off. During the sensing time, the sensing data Dsen outputted from the sensing channels of the data driver 110 is transmitted to the timing controller 130.

Figure 3:
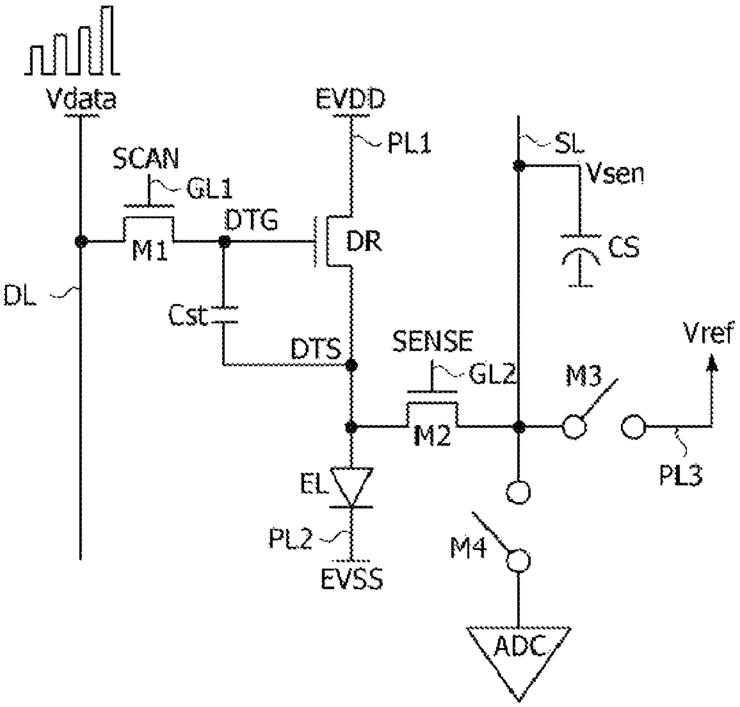
FIG. 3 is a circuit diagram illustrating a pixel circuit and a sensing circuit according to one exemplary embodiment of the present disclosure.
Figure 4:
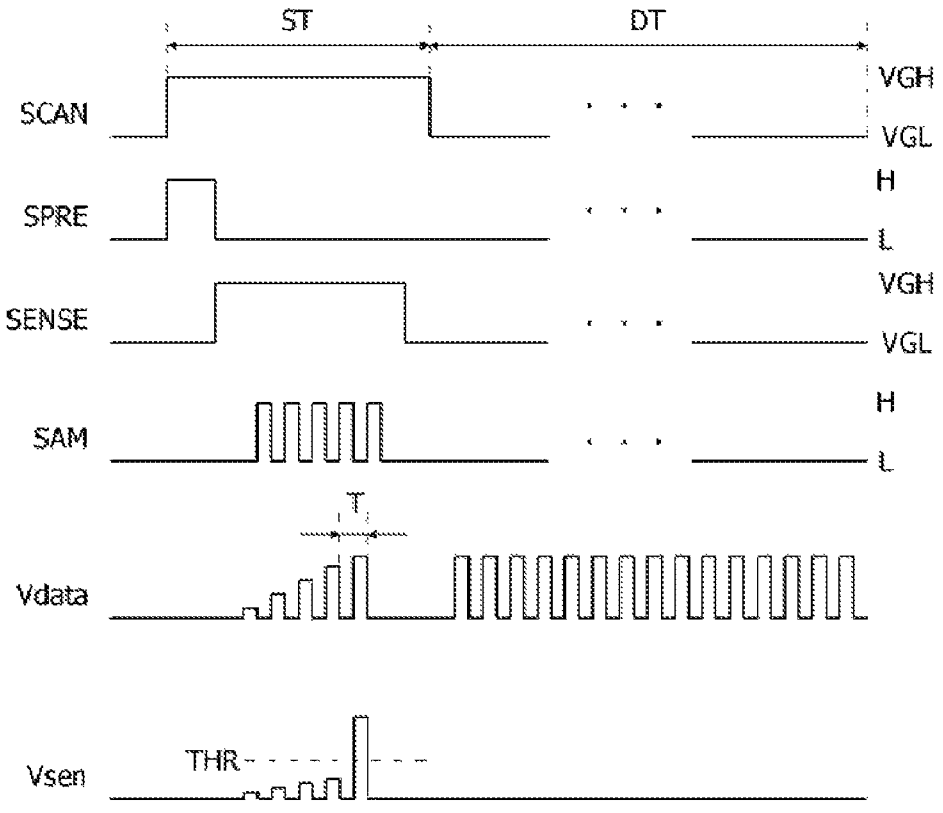
FIG. 4 is a waveform diagram illustrating signals applied to the pixel circuit shown in FIG. 3.

FIG. 3 is a circuit diagram illustrating a pixel circuit and a sensing circuit according to one exemplary embodiment of the present disclosure. FIG. 4 is a waveform diagram illustrating signals applied to the pixel circuit shown in FIG. 3. The pixel circuit of the present disclosure is not limited to that shown in FIG. 3, and various configurations of internal compensation circuits are possible. For example, a number of transistors which function as driving element and switch elements, in the pixel circuit of the present disclosure may be three or more, and a number of storage capacitors may be one or more, for example, the pixel circuit of the present disclosure also be a 3TIC pixel circuit including three transistors and one storage capacitor, a 3T2C pixel circuit including three transistors and two storage capacitors, a 5TIC pixel circuit including five transistors and one storage capacitor, a 5T2C pixel circuit including five transistors and two storage capacitors, a 7T2C pixel circuit including seven transistors and two storage capacitors, or the like, and the present disclosure is not limited thereto.

Referring to FIGS. 3 and 4, the pixel circuit includes an emitting element El, a driving element DR, a capacitor Cst, and first and second switch elements M1 and M2. The sensing circuit includes an ADC, and third and fourth switch elements M3 and M4. The driving element DR and the switch elements M1 to M4 may be implemented as, but are not limited to, n-channel transistors. For example, the driving element DR and the switch elements M1 to M4 may be implemented as, p-channel transistors. Or for example, one or more of the driving element DR and the switch elements M1 to M4 may be implemented as, p-channel transistors, and the others may be implemented as, n-channel transistors. The ADC and the switch elements M3 and M4 of the sensing circuit may be disposed in the sensing channel of the data driver 110.

The pixel circuit is connected to constant voltage nodes, such as a first constant voltage node PL1 to which a pixel driving voltage EVDD is applied, a second constant voltage node PL2 to which a cathode voltage EVSS is applied, and a third constant voltage node PL3 to which a reference voltage Vref is applied. The constant voltage nodes PL1, PL2, and PL3 are connected to the power lines commonly connected to the pixels. The pixel driving voltage EVDD is set to a voltage at which the driving element DR operates in a saturation region. The pixel driving voltage EVDD is a voltage higher than the maximum voltage (or white grayscale voltage) of the data voltage Vdata. The cathode voltage EVSS and the reference voltage Vref are voltages lower than the pixel driving voltage EVDD and lower than the minimum voltage (or black grayscale voltage) of the data voltage Vdata.

The pixel circuit is connected to a data line DL to which the data voltage Vdata is applied, a first gate line GL1 to which a first gate signal SCAN is applied, a second gate line GL2 to which a second gate signal SENSE is applied, and a sensing line SL.

During a sensing time ST, the data driver 110 outputs a pulse whose voltage increases stepwise as shown in FIG. 4 under the control of the timing controller 130. The timing controller 130 may transmit a pulse whose data value is increased regardless of the pixel data of the input image to the data drive 110 during the sensing time ST. The data driver 110 may convert the data received from the timing controller 130 into the data voltage Vdata through the DAC in the data channel.

During the sensing time ST, the pulses of the data voltage Vdata are applied to a first node DTG while the first and second switch elements M1 and M2 are in the on state (e.g., the gate signals of first and second switch elements M1 and M2 are turned on in response to the gate high voltage VGH). In this case, a pulse voltage of the data voltage Vdata applied to the first node DTG and a sensing voltage Vsen sensed from a second node DTS are a gate-source voltage Vgs of the driving element DR. Therefore, a threshold voltage Vth of the driving element DR may be sensed as the sensing voltage Vsen that rises rapidly when the driving element DR is turned on by applying the pulse voltage of the data voltage Vdata to the second node DTS.

During the display time DT, the data channels of the data driver 110 convert the pixel data of the input image received from the timing controller 130 into the data voltage Vdata to output it.

The gate driver 120 outputs the first and second gate signals SCAN and SENSE under the control of the timing controller 130 during the sensing time ST to control the first and second switch elements M1 and M2. A control circuit in the timing controller 130 or the data driver 110 may generate the third and fourth gate signals SPRE and SAM for controlling the third and fourth switch elements M3 and M4 of the sensing circuit to control the switch elements M3 and M4. The third and fourth gate signals SPRE and SAM may include pulses that swing between a high voltage H and a low voltage L of the digital signal voltage level.

The first gate signal SCAN includes a pulse that maintains the gate high voltage VGH for a predetermined time, for example, 20 horizontal periods, during the sensing time ST. The first switch element M1 is turned on in response to the gate high voltage VGH of the first gate signal SCAN and turned off when the voltage of the first gate signal SCAN is the gate low voltage VGL.

The second gate signal SENSE includes a pulse of the gate high voltage VGH generated during the sensing time ST. The second switch element M2 is turned on in response to the gate high voltage VGH of the second gate signal SENSE. The second switch element M2 is turned on after the first switch element M1 is turned on, and turned off when the voltage of the second gate signal SENSE is the gate low voltage VGL. During the sensing time ST, the voltage of the second gate signal SENSE rises to the gate high voltage VGH after the voltage of the first gate signal SCAN is inverted to the gate high voltage VGH. During the sensing time ST, the voltage of the first gate signal SCAN is decreased to the gate low voltage VGL after the voltage of the second gate signal SENSE is decreased to the gate low voltage VGL.

The third gate signal SPRE includes a pulse of the high voltage H that is generated during the sensing time ST. The third switch element M3 is turned on in response to the high voltage H of the third gate signal SPRE, and is turned off when the voltage of the third gate signal SPRE is the low voltage L. The third switch element M3 is turned on prior to the second switch element M2. The voltage of the third gate signal SPRE rises to the high voltage H when the voltage of the first gate signal SCAN is changed to the gate high voltage VGH and decreases to the low voltage L when the voltage of the second gate signal SENSE is changed to the gate high voltage VGH.

The fourth gate signal SAM includes a pulse of the high voltage H generated during the sensing time ST. The fourth switch element M4 is turned on in response to the high voltage H of the fourth gate signal SAM, and is turned off when the voltage of the fourth gate signal SAM is the low voltage L. The fourth gate signal SAM is generated as a pulse of the high voltage H whenever a pulse of the data voltage Vdata is applied to the first node DTG to transmit the sensing voltage Vsen on the sensing line SL to the ADC. The pulse of the fourth gate signal SAM is repeatedly generated while the voltages of the first and second gate signals SCAN and SENSE maintain the gate high voltage VGH, that is, while the first and second switch elements M1 and M2 remain in the on state. The pulse of the fourth gate signal SAM and the pulse of the data voltage Vdata are alternated, that is, the fourth gate signal SAMs is changed to the gate high voltage VGH when pulse of the data voltage Vdata is decreased to low level. Thus, the fourth switch element M4 is turned on whenever the pulse of the data voltage Vdata is applied to the first node DTG of the pixel circuit.

During the sensing time ST, the data voltage Vdata applied to the data line DL may include a plurality of pulses whose voltages are increased stepwise. A pulse period T of the data voltage Vdata may be, but is not limited to, two horizontal periods. When the resolution x*y of the display panel 100 is 3,840 pixels*4 colors, one horizontal period may be approximately 1.7 [usec]. According to the present disclosure, since the threshold voltage Vth of the driving elements DR of each sub-pixel is sensed while varying the voltage level of the data voltage Vdata, the sensing time ST may be significantly reduced compared to a sensing method of utilizing a source follower circuit of the prior art. Therefore, the present disclosure reduces the power consumption of the display device and enables high-speed sensing even if the resolution of the display device is increased and the driving speed thereof is increased.

The driving element DR drives the light emitting element EL by supplying current to the light emitting element EL according to the gate-source voltage Vgs. The voltage between the first node DTG and the second node DTS is the gate-source voltage Vgs of the driving element DR. The driving element DR includes a first electrode connected to the first constant voltage node PL1 to which the pixel driving voltage EVDD is applied, a gate electrode connected to the first node DTG, and a second electrode connected to the second node DTS. The capacitor Cst is connected between the first node DTG and the second node DTS.

The light emitting element EL may be implemented as an organic LED, inorganic LED, micro-LEDs, mini-LEDs, etc. The organic light emitting element EL may include an anode electrode, a cathode electrode, and an organic compound layer formed between the electrodes. The anode electrode of the light emitting element EL is connected to the second node DTS of the driving element DR, and the cathode electrode is connected to the second constant voltage node PL2 to which the cathode voltage EVSS is applied. The organic compound layer may include, but not limited to, a hole injection layer (HIL), a hole transport layer (HTL), a light emission layer (EML), an electron transport layer (ETL), and an electron injection layer (EIL). When a voltage is applied to the anode and cathode electrodes of the light emitting element EL, holes passing through the hole transport layer (HTL) and electrons passing through the electron transport layer (ETL) move to the emission layer (EML) to form excitons. In this case, visible light is emitted from the light emission layer EML. But embodiments are not limited thereto. As an example, at least one of the hole injection layer HIL, the hole transport layer HTL, the electron transport layer ETL, and the electron injection layer EIL may be omitted. As an example, the light emitting element EL may be implemented as a tandem structure with a plurality of light emitting layers stacked on top of each other. The light emitting element EL having the tandem structure may improve the luminance and lifespan of pixels. The first switch element M1 is connected between the data line DL and the first node DTG and is turned on in response to the gate high voltage VGH of the first gate signal SCAN. When the first switch element M1 is turned on, the data voltage Vdata is applied to the first node DTG (i.e., the gate electrode of the driving element DR). The first switch element M1 includes a first electrode connected to the data line DL, a gate electrode connected to the first gate line GL1 to which the first gate signal SCAN is applied, and a second electrode connected to the first node DTG.

The second switch element M2 is connected between the second node DTS and the sensing line SL and is turned on in response to the gate high voltage VGH of the second gate signal SENSE. When the second switch element M2 is turned on, the second node DTS (i.e., source electrode of the driving element DR) is electrically connected to the sensing line SL. The second switch element M2 includes a first electrode connected to the second node DTS, a gate electrode connected to the second gate line GL2 to which the second gate signal SENSE is applied, and a second electrode connected to the sensing line SL.

A capacitor CS in which the sensing voltage Vsen is stored may be connected to the sensing line SL. The capacitor CS may be formed as a parasitic capacitance connected to the sensing line SL or as a separate capacitor connected to the sensing line SL.

The third switch element M3 is connected between the sensing line SL and the third constant voltage node PL3 to which the reference voltage Vref is applied, and is turned on in response to the high voltage H of the third gate signal SPRE. When the third switch element M3 is turned on, the reference voltage Vref is applied to the sensing line SL to initialize the sensing line SL to the reference voltage Vref. The third switch element M3 includes a first electrode connected to the sensing line SL, a gate electrode to which the third gate signal SPRE is applied, and a second electrode connected to the third constant voltage node PL3 to which the reference voltage Vref is applied.

The fourth switch element M4 is connected between the sensing line SL and the ADC and is turned on in response to the high voltage H of the fourth gate signal SAM. When the fourth switch element M4 is turned on, the voltage Vsen sensed from the second node DTS of the pixel circuit is inputted to the ADC via the sensing line SL and the fourth switch element M4.

While the first and second switch elements M1 and M2 remain in the on state, a pulse of the third gate signal SAM is generated as the high voltage H. Since the fourth switch element M4 is turned on for each pulse of the third gate signal SAM, the sensing voltage Vsen, which varies with the pulse voltage of the data voltage Vdata, is inputted to the ADC for every pulse of the third gate signal SAM.

The ADC converts the sensing voltage Vsen into the digital data to output the sensing data Dsen. The fourth switch element M4 includes a first electrode connected to the sensing line SL, a gate electrode to which the fourth gate signal SAM is applied, and a second electrode connected to an input terminal of the ADC. Meanwhile, a sample & hold circuit, an amplifier, an integrator, and the like may be added between the fourth switch element M4 and the ADC, and the present disclosure is not limited thereto.

During the sensing time ST, as the voltage of the data voltage Vdata applied to the first node DTG is increased stepwise by a plurality of pulses, the gate-source voltage Vgs of the driving element DR becomes greater than the threshold voltage Vth of the driving element DR to turn on the driving element DR, which causes the drain-source current of the driving element DR to rapidly increase. Thus, when the driving element DR is turned on, the voltage of the second node DTS rises rapidly, and thus the sensing voltage Vsen inputted to the ADC rises rapidly accordingly.

The timing controller 130 may compare the sensing data Dsen received from the sensing channel of the data drive 110 with a predetermined threshold value THR; and when the value of the sensing data Dsen is greater than the threshold value THR, the controller 130 may determine the sensing voltage Vsen indicated by the sensing data Dsen which has been received from the ADC as the threshold voltage Vth of the driving element DR and derive a compensation value to compensate for the amount of a shift of the threshold voltage of the driving element DR. The threshold voltage Vth corresponding to the sensing voltage Vsen and the compensation value for compensating the amount of a shift of the threshold voltage Vth may be stored in advance in a look-up table memory that is accessed by the timing controller 130. Threshold voltage data stored in the look-up table memory may be stored for each sub-pixel. The look-up table memory may output a compensation value for the threshold voltage Vth stored at an address indicated by the sensing data Dsen when the sensing data Dsen is inputted. The timing controller 130 may update the threshold voltage data stored in the look-up table memory with the sensing data Dsen received from the ADC. In addition to using lookup table memory for threshold voltage compensation, the other method, such as Closed-loop feedback (e.g., using a closed-loop feedback system to monitor the circuit's performance and adjust the threshold voltage accordingly) or On-chip monitoring circuits (e.g., by integrating on-chip monitoring circuits, such as ring oscillators or current sensors, the threshold voltage variations can be detected and compensated for in real-time) may be applied.

The timing controller 130 modulates the pixel data DATA of the input image by adding or multiplying the compensation value derived based on the sensing data Dsen to the pixel data DATA. The modulated pixel data DATA' has a grayscale whose value is modulated by the amount of shift of the threshold voltage of the driving element DR. The modulated pixel data DATA' from the timing controller 130 is transmitted to the data driver 110 for writing to the sub-pixels during the display time DT. The data driver 110 converts the modulated pixel data DATA' received from the timing controller 130 during the display time DT into the data voltage Vdata and outputs the converted data voltage Vdata.

Figure 5:
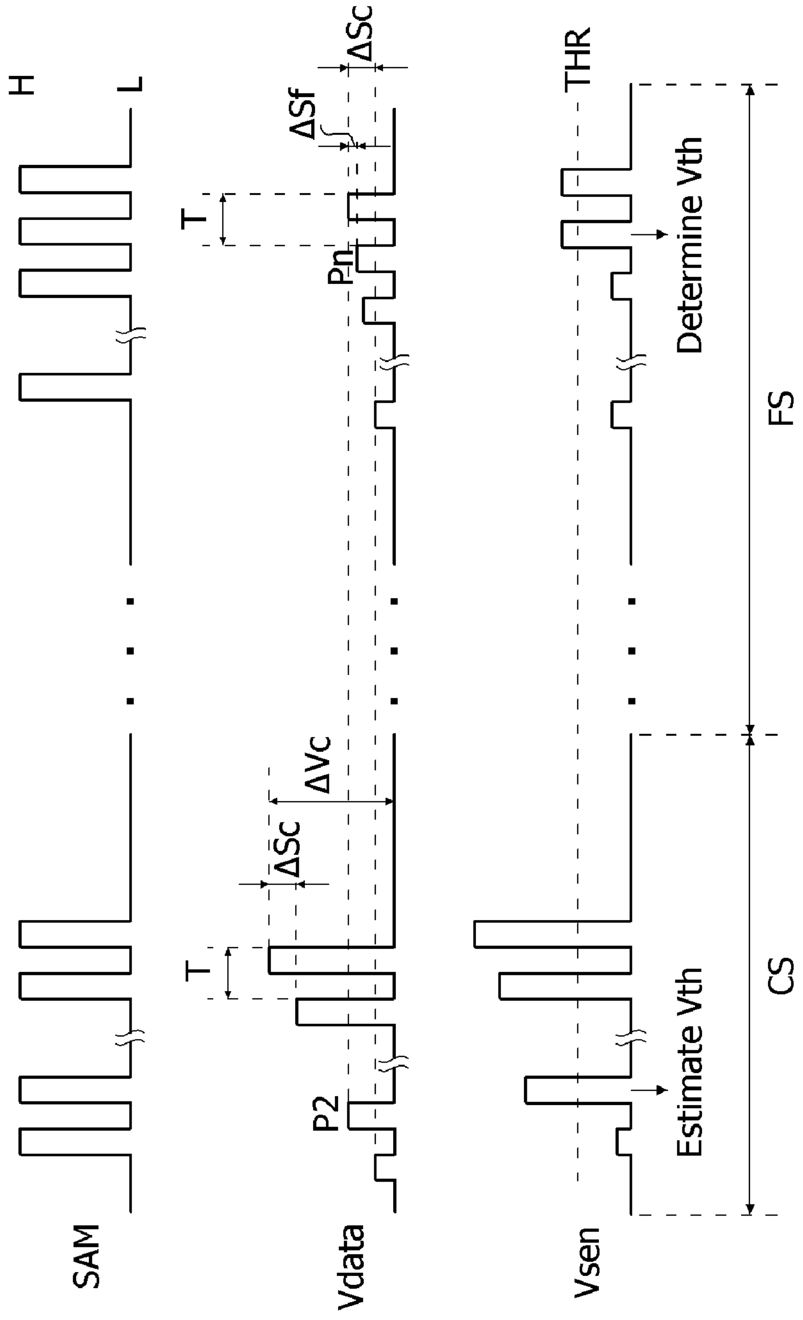
FIG. 5 is a waveform diagram illustrating the voltage range of the data voltage and the voltage step difference between neighboring pulses in coarse sensing and fine sensing according to the embodiment of the present disclosure.

The sensing time TS may be divided into a coarse sensing time CS (or first sensing process) and a fine sensing time FS (or second sensing process), as shown in FIG. 5.

Referring to FIG. 5, a voltage range ΔVc between the minimum pulse voltage and the maximum pulse voltage of the data voltage Vdata is set relatively large during the coarse sensing time CS. A voltage step difference ΔSc between adjacent pulses within this voltage range ΔVc is also set relatively large.

During the coarse sensing time CS, the threshold voltage Vth of the driving element DR may be quickly estimated by the relatively large voltage step difference ΔSc between adjacent pulses of the data voltage Vdata. In a process of coarse sensing, the gate-source voltage Vgs of the driving element DR, e.g., the voltage between the first node DTG to which a pulse P2 of the data voltage Vdata is applied and the second node DTS, may be estimated as the threshold voltage Vth of the driving element DR when a first sensing voltage Vsen greater than the threshold value THR is detected while the data voltage Vdata is increased stepwise. In this case, the pulse voltage of the data voltage Vdata applied to the first node DTG may be set to an upper limit voltage of a fine sensing voltage range.

The fine sensing voltage range may be set as the step difference ΔSc between adjacent pulses of the data voltage Vdata used in coarse sensing. The upper limit voltage of the fine sensing voltage range may be the pulse voltage of the data voltage Vdata applied to the first node DTG when the threshold voltage Vth of the driving element DR is estimated in coarse sensing. A voltage step difference ΔSf between adjacent pulses of the data voltage Vdata in fine sensing may be a small voltage less than or equal to 1/n of ΔSc (where n is a natural number greater than or equal to 2), for example, a voltage of $\frac{1}{5}$ of ΔSc, and the present disclosure is not limited thereto, for example, a voltage step difference ΔSf between adjacent pulses of the data voltage Vdata in fine sensing may be a voltage of $\frac{1}{6}$ of ΔSc.

During the fine sensing time FS, the threshold voltage Vth of the driving element DR is finely sensed within the fine sensing voltage range set as a result of the coarse sensing. In a process of fine sensing, the threshold voltage Vth of the driving element DR may be more accurately sensed because the voltage step difference ΔSf of the data voltage Vdata applied to the pixel circuit during the fine sensing time FS is smaller than the voltage step difference ΔSc of the data voltage Vdata applied to the pixel circuit during the coarse sensing time CS.

During the fine sensing time FS, a first sensing voltage Vsen greater than the threshold THR may be detected when an $n^{th}$ pulse Pn of the data voltage Vdata is applied. In this case, the gate-source voltage Vgs of the driving element DR is the threshold voltage Vth of the driving element DR. The timing controller 130 may determine the threshold voltage Vth of the driving element DR for each sub-pixel by comparing the sensing data Dsen, which indicate the sensing voltage Vsen sensed from the second node DTS of each sub-pixel through coarse sensing and fine sensing, with the threshold value THR.

Figure 6:
FIG. 6 is a diagram illustrating an example of a coarse sensing time and first and second fine sensing times set within a one-frame period according to the embodiment of the present disclosure.

FIG. 6 is a diagram illustrating an example of a coarse sensing time and first and second fine sensing times set within a one-frame period.

Referring to FIG. 6, the sensing time ST may be divided into a coarse sensing time CS and a fine sensing time FS. The fine sensing time FS may be divided into at least a first fine sensing time FS1 and a second fine sensing time FS2. The waveforms of the gate signals SCAN, SENSE, SPRE, and SAM generated during the fine sensing time FS may be substantially the same as the waveforms of the gate signals SCAN, SENSE, SPRE, and SAM generated during the coarse sensing period CS.

A one-pulse period T of the data voltage Vdata may be set to be equal to the coarse sensing time CS and the fine sensing time FS. For example, during the coarse sensing time CS and the fine sensing time FS, the data voltage Vdata may be successively generated as a pulse with a pulse period T of two horizontal periods.

During the coarse sensing time CS, the voltage step difference ΔSc between adjacent pulses of the data voltage Vdata may be set to a relatively large voltage, e.g., 0.5V, but not limited thereto. In this case, the data voltage Vdata may be increased by 0.5 V for every pulse during the coarse sensing time CS. As a result of coarse sensing, the pulse voltage of the data voltage Vdata may be set to an upper limit voltage of the first fine sensing voltage range, when the threshold voltage Vth of the driving element DR is detected.

During the first fine sensing time FS1, the voltage step difference ΔSf of the data voltage Vdata is set to a voltage less than the voltage step difference ΔSc set in coarse sensing within the first fine sensing voltage range. For example, during the first fine sensing time FS1, the data voltage Vdata may be increased by 0.1 V for every pulse. As a result of first fine sensing, the sensing voltage Vsen sensed when the digital value of the sensing voltage Vsen is greater than the threshold value THR may be primarily determined as the threshold voltage Vth of the driving element DR. In this case, the pulse voltage of the data voltage Vdata applied to the first node DTG may be set to an upper limit voltage of the second fine-sensing voltage range.

During the second fine sensing time FS2, the sensing voltage range and the voltage step difference ΔSf of the data voltage Vdata may be smaller than those of the first fine sensing time FS1. For example, during the second fine sensing time FS2, the data voltage Vdata may be increased by 0.01 V for every pulse. As a result of second fine sensing, the sensing voltage Vsen sensed when the sensing data Dsen indicating the voltage level of the sensing voltage Vsen is greater than the threshold value THR may be determined secondarily (finally) as the threshold voltage Vth of the driving element DR.

The sensing time of the threshold voltage of the driving element DR may be increased according to the panel characteristics of the display panel 100 and the driving conditions thereof. In this case, the fine sensing period may be divided across a plurality of frame periods, as illustrated in FIG. 7.

Figure 7:
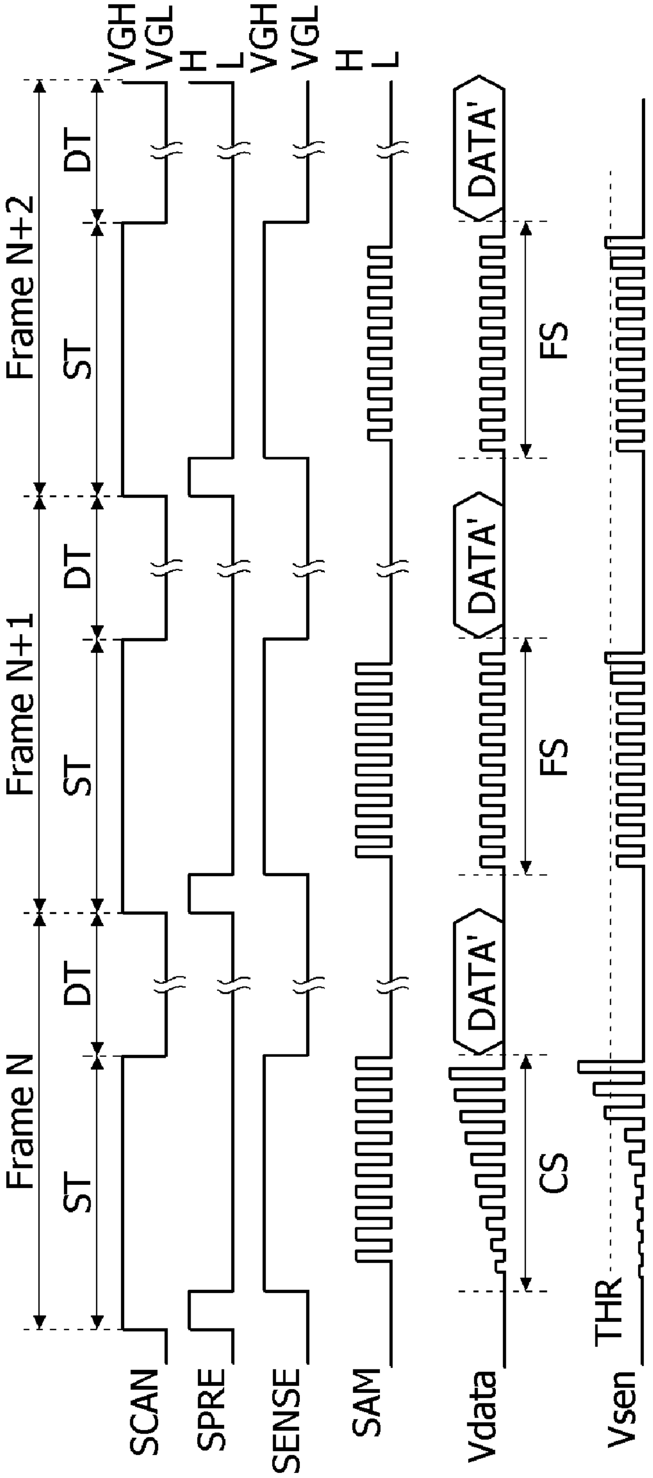
FIG. 7 is a diagram illustrating an example in which a fine sensing time is divided during a plurality of frame periods according to the embodiment of the present disclosure.

Referring to FIG. 7, an $N^{th}$ frame period 'Frame N' (where N is a natural number) includes a coarse sensing time CS and a display time DT. An $(N+1)^{th}$ frame period 'Frame N+1' and an $(N+2)^{th}$ frame period 'Frame N+2' each include a fine sensing time FS and a display time DT.

The fine sensing time FS allocated to each of the $(N+1)^{th}$ frame period 'Frame N+1' and the $(N+2)^{th}$ frame period 'Frame N+2' may be divided into at least a first fine sensing time FS1 and a second fine sensing time FS2.

In another embodiment, the fine sensing time FS allocated to the $(N+1)^{th}$ frame period may be the first fine sensing time FS1, and the fine sensing time FS allocated to the $(N+2)^{th}$ frame period may be the second fine sensing time FS2. The first fine sensing time FS1 and the second fine sensing time FS2 may be same or different.

Within a one-frame period, the threshold voltage of the driving element DR may be sensed for a predetermined number of pixel lines. In one example, the threshold voltage of the driving element DR in I pixel lines (where I is a natural number greater than or equal to 2) may be sensed during the coarse sensing time CS of the Nth frame period. Then, during the fine sensing time FS of the $N+1^{th}$ frame period, the threshold voltage of the driving element DR in each of the I pixel lines that were coarse-sensed in the previous frame, that is, in the Nth frame period, may be sensed.

Figure 8:
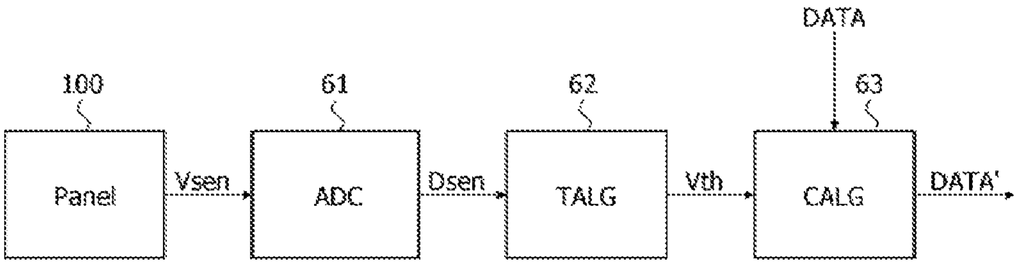
FIG. 8 is a diagram illustrating a path for the transmission of a sensing voltage according to the embodiment of the present disclosure.

FIG. 8 is a diagram illustrating a path for the transmission of the sensing voltage.

Referring to FIG. 8, the sensing circuit receives the sensing voltage Vsen via the sensing line SL on the display panel 100 and converts the sensing voltage Vsen into digital data, which is the sensing data Dsen, through the ADC.

The timing controller 130 may include a first algorithmic processing circuit 62 and a second algorithmic processing circuit 63. In FIG. 8, 'TALG' is the first algorithm processing circuit, and 'CALG' is the second algorithm processing circuit.

The first algorithm processing circuit 62 receives the sensing data Dsen, which indicate the voltage level of the sensing voltage Vth, using a preset algorithm for threshold voltage conversion or a look-up table memory and determines the threshold voltage Vth of the driving element DR. The second algorithm processing circuit 63 derives a compensation value corresponding to the threshold voltage Vth of the driving element DR from each of the sub-pixels using a preset compensation algorithm or a look-up table memory, modulates the pixel data DATA using the compensation value, and outputs the compensated pixel data DATA' by the amount of the shift in the threshold voltage.

Figure 9:
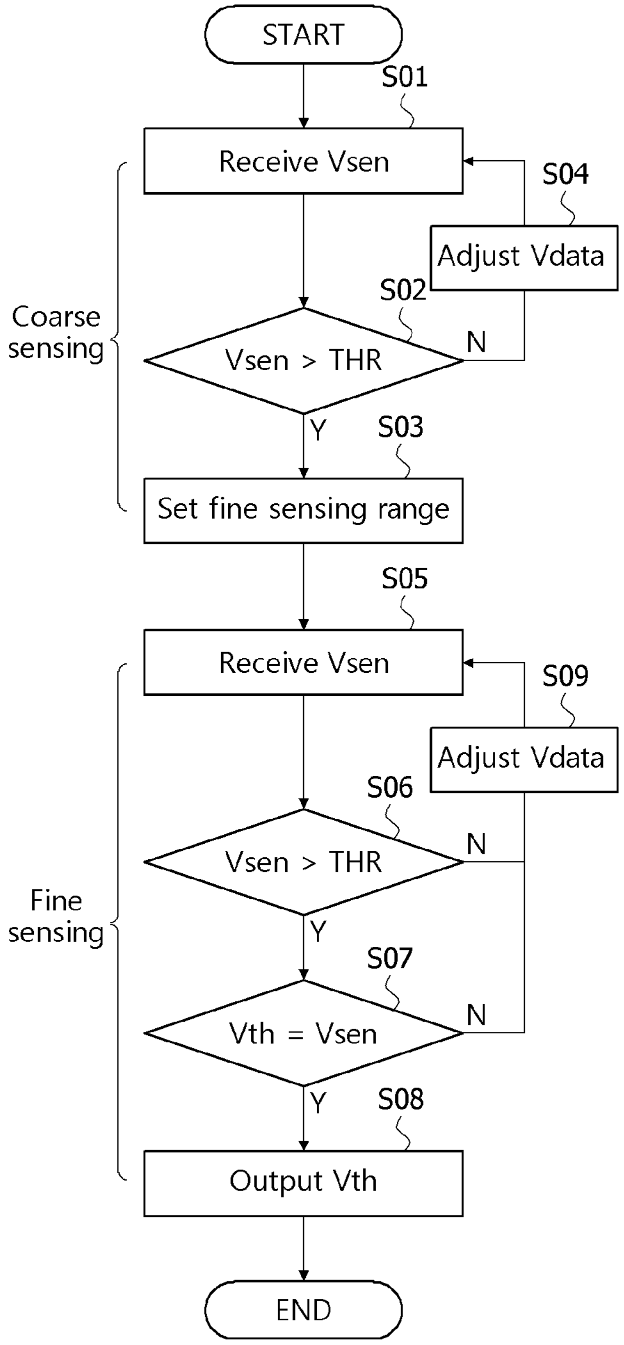
FIG. 9 is a flowchart illustrating coarse sensing and fine sensing in detail according to the embodiment of the present disclosure.

FIG. 9 is a flowchart illustrating the coarse sensing process and the fine sensing process in detail. In FIG. 9, "Y" indicates "Yes" and "N" indicates "No".

Referring to FIG. 9, in a process of coarse sensing, whenever a pulse of the data voltage Vdata is applied to the pixel circuit, the sensing voltage Vsen sensed from the second node DTS of the pixel circuit is inputted to the ADC (S01). The ADC converts the sensing voltage Vsen into the digital data and outputs the sensing data Dsen. The sensing data Dsen outputted from the ADC has a data value that indicates the voltage level of the sensing voltage Vsen.

The timing controller 130 receives the sensing data Dsen for each pulse of the data voltage Vdata and compares the sensing voltage Vsen with a threshold value, and when the sensing voltage Vsen is detected to be greater than the threshold value, the timing controller 130 may set the fine sensing voltage range based on the pulse voltage of the data voltage Vdata applied to the pixel circuit (S02 and S03).

In the process of coarse sensing, when the sensing voltage Vsen is less than or equal to the threshold value, the timing controller 130 controls the data driver 110 to increase the pulse voltage of the data voltage Vdata by a preset step difference ΔSc (S04). The timing controller 130 may increase stepwise the pulse voltage of the data voltage Vdata until the sensing voltage Vsen is greater than the threshold value.

In a process of fine sensing, the data voltage Vdata applied to the pixel circuit includes a pulse whose voltage is increased stepwise to the voltage step difference Δsf, which is smaller than the step difference ΔSc in the process of coarse sensing. Each time the pulse of the data voltage Vdata is applied to the pixel circuit, the sensing voltage Vsen sensed from the second node DTS of the pixel circuit is inputted to the ADC (S05). The ADC converts the sensing voltage Vsen into the digital data and outputs the sensing data Dsen.

The timing controller 130 receives the sensing data Dsen for each pulse of the data voltage Vdata and compares the sensing voltage Vsen with a threshold value, and when the sensing voltage Vsen is detected to be greater than the threshold value, the timing controller 130 may determine the sensing voltage Vsen as the threshold voltage Vth of the driving element DR and output the threshold voltage Vth (S06, S07, and S08).

In the process of fine sensing, the timing controller 130 controls the data driver 110 to gradually increase the pulse voltage of the data voltage Vdata by a step difference ΔSf when the sensing voltage Vsen is less than or equal to the threshold value (S09). The timing controller 130 may increase stepwise the pulse voltage of the data voltage Vdata until the sensing voltage Vsen is greater than the threshold value.

Figure 10:
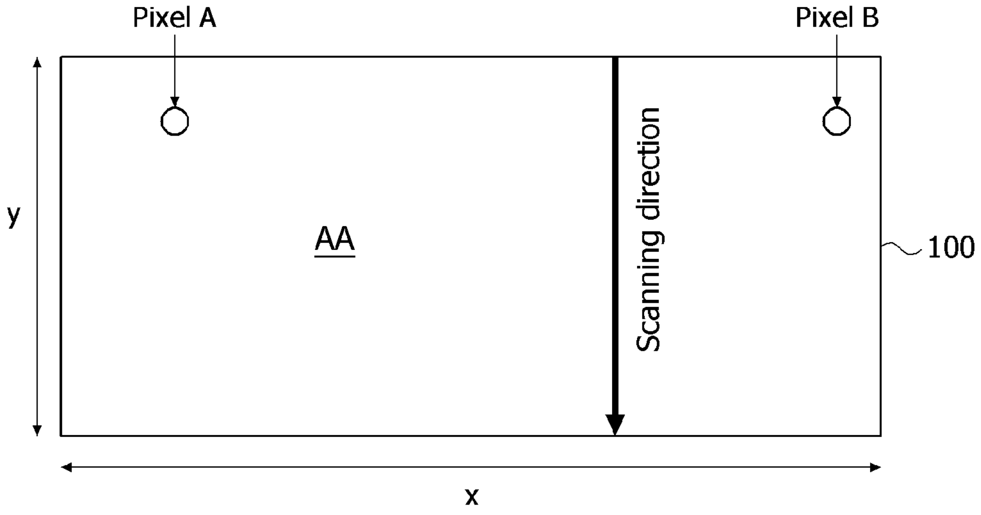
FIG. 10 is a diagram illustrating an example of first and second sub-pixels with different threshold voltages of the driving elements according to the embodiment of the present disclosure.

Due to process deviations in the manufacturing process of the display panel 100, or due to stress deviations accumulated over the driving time of the pixels, the threshold voltage Vth of the driving element DR may be different at first and second sub-pixels 'Pixel A' and 'Pixel B' spaced apart on the display panel 100, as shown in FIG. 10. An example in which the threshold voltage of the driving element DR is sensed at these sub-pixels Pixel A and Pixel B will be described in conjunction with FIGS. 10 and 11. It is assumed that the first and second sub-pixels are on the same pixel line and are sensed simultaneously.

Figure 11:
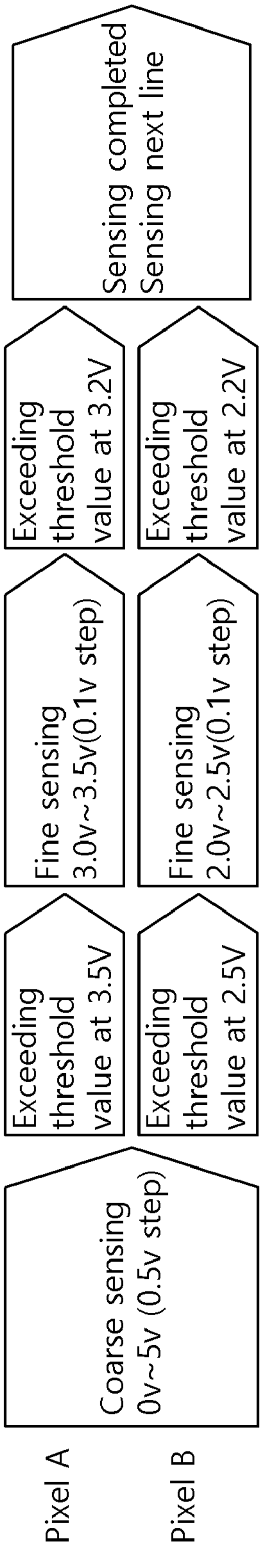
FIG. 11 is a diagram illustrating the process of coarse sensing and fine sensing for the first and second sub-pixels shown in FIG. 10.

Referring to FIGS. 10 and 11, during the sensing time TS, a pulse of the data voltage Vdata and the gate signals SCAN, SENSE, SPRE, and SAM may be applied simultaneously to the sub-pixels of the pixel line on which the first and second sub-pixels Pixel A and Pixel B are arranged. In this case, sensing voltages Vsen may be obtained simultaneously from the first and second sub-pixels Pixel A and Pixel B. A sensing voltage sensed from the second node DTS of the first sub-pixel Pixel A may be inputted to a first ADC disposed in a first sensing channel of the data driver 110. At the same time, a sensing voltage sensed from the second node DTS of the second sub-pixel Pixel B may be inputted to a second ADC disposed in a second sensing channel of the data drive 110.

During the coarse sensing time CS, the pulses of the data voltages Vdata are applied to the pixel circuits of each of the first and second sub-pixels Pixel A and Pixel B. In coarse sensing, the voltage range ΔVc of the data voltage Vdata may be 0 [V] to 5 [V], and the voltage step difference ΔSc between adjacent pulses may be 0.5 [V]. In the coarse sensing time CS, when the sensing voltage Vsen sensed from the first sub-pixel Pixel A is 3.5 [V] exceeding the threshold THR, the threshold voltage Vth of the driving element DR disposed in the first sub-pixel Pixel A may be sensed. In contrast, when the sensing voltage Vsen sensed from the second sub-pixel Pixel B is 2.5 [V] exceeding the threshold THR, the threshold voltage Vth of the driving element DR disposed in the second sub-pixel Pixel B may be sensed.

The fine sensing voltage range may be set based on the pulse voltage of the data voltage Vdata applied when the threshold voltage Vth of the driving element DR is sensed in coarse sensing of each of the first and second sub-pixels Pixel A and Pixel B. The fine sensing voltage range may be set as a pulse voltage of the data voltage Vdata applied when the threshold voltage Vth is sensed. The fine sensing voltage range may be set as the step difference ΔSc between adjacent pulses of the data voltage Vdata used in coarse sensing. For example, the fine sensing voltage range may be 3.0 [V] to 3.5 [V], as shown in FIG. 11, and the voltage step difference ΔSf of the data voltage Vdata may be 0.1 [V].

During the fine sensing time FS, the pulse of the data voltage Vdata is applied to the pixel circuit of each of the first and second sub-pixels Pixel A and Pixel B. In this case, the pulses of the data voltage Vdata having the voltage step difference ΔSf of 0.1 [V] may be applied to the pixel circuit of each of the first and second sub-pixels Pixel A and Pixel B.

In the fine sensing time TS, when the sensing voltage Vsen sensed from the first sub-pixel Pixel A is 3.2 [V] exceeding the threshold value THR, the threshold voltage Vth of the driving element DR disposed in the first sub-pixel Pixel A may be sensed as 3.2 [V]. In contrast, when the sensing voltage Vsen sensed from the second sub-pixel Pixel B is 2.2 [V] exceeding the threshold value THR, the threshold voltage Vth of the driving element DR disposed in the second sub-pixel Pixel B may be sensed as 2.2 [V].

After a pixel line on which the first and second sub-pixels Pixel A and Pixel B are arranged has been scanned, the next pixel line along the shift direction of the gate signals SCAN, SENSE, SPRE, and SAM is scanned, and the threshold voltage of the driving element DR of the sub-pixels arranged on that pixel line may be sensed.

Figure 12:
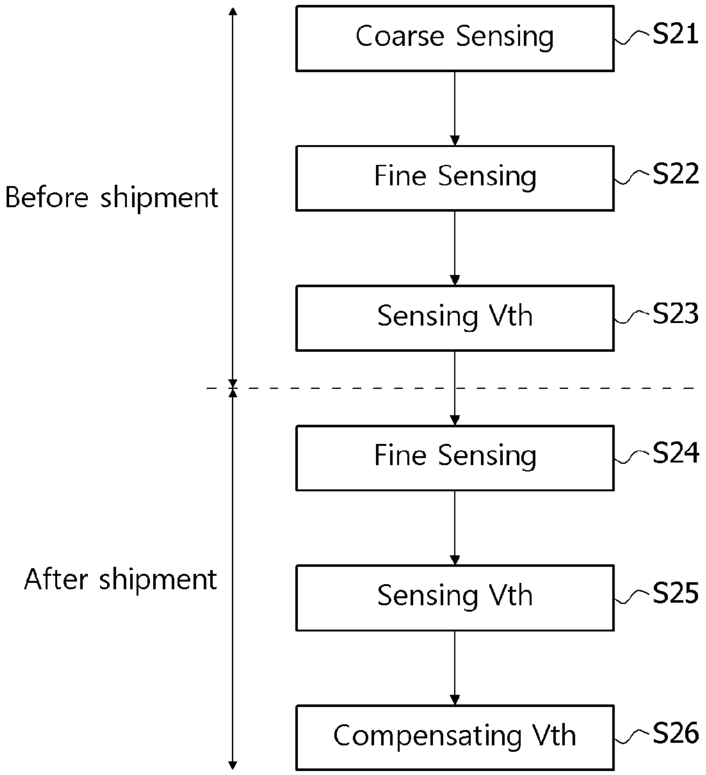
FIGS. 12 and 13 are flowcharts illustrating a sensing method before and after product shipment of a display panel according to the embodiment of the present disclosure.
Figure 13:
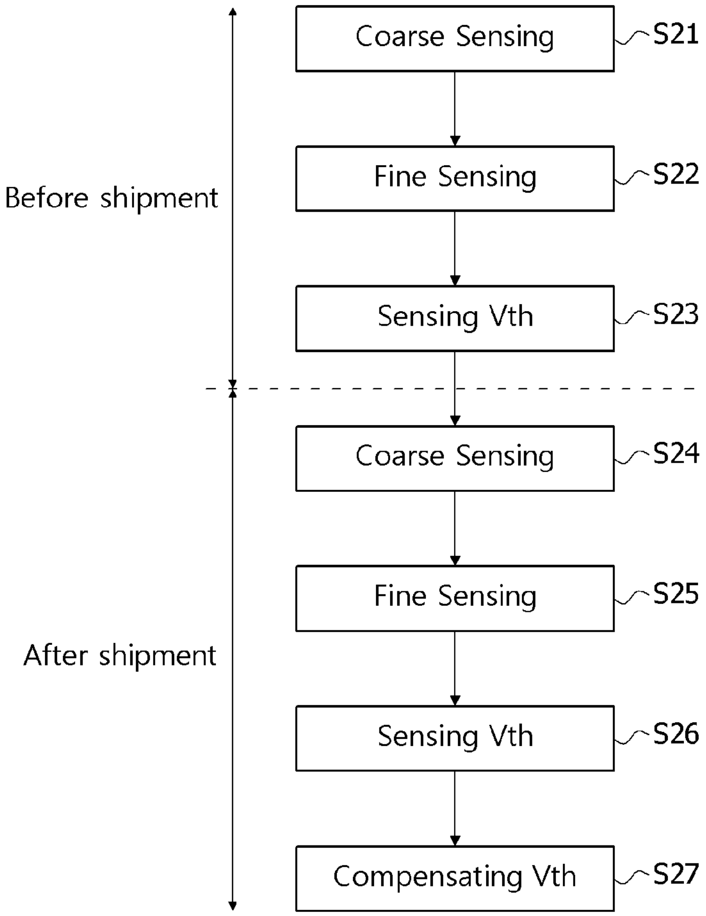

FIGS. 12 and 13 are flowcharts illustrating a sensing method before and after product shipment of the display panel.

Referring to FIG. 12, after an aging process before the display panel's product is shipped, the threshold voltage Vth of the driving element DR may be sensed for all sub-pixels of the display panel 100 and stored in the look-up table memory controlled by the timing controller 130. In order to sense the threshold voltage Vth of the drive element DR in each sub-pixel in a process before the product is shipped, the coarse sensing process S21 and the fine sensing process S22 may be performed successively. As a result of fine sensing, the threshold voltage Vth sensed in each of the sub-pixels may be stored in the look-up table memory (S23).

After the product of the display panel 100 is shipped, the display panel may be handed over to a set maker. In the set maker, a host system is connected to the display panel driving circuit of the display panel 100, and the display panel is completed as a user-usable product. After the product of the display panel 100 is shipped, the threshold voltage Vth of the driving element DR in each of the sub-pixels may be sensed using only fine sensing (S24 and S25). The display device may modulate the pixel data with the compensation value that compensates for the sensed threshold voltage Vth of the driving element DR in each of the sub-pixels during the display time DT, thereby compensating for the amount of the shift in the threshold voltage Vth of the driving element DR to improve the image quality (S26).

When a user uses the product of the display panel 100 after its shipment, the sensing time ST may be reduced when the threshold voltage Vth of the driving element DR is sensed using only fine sensing. In this case, the power consumption of the display device is lowered and the display panel may be sensed at high speed since the voltage range of the data voltage Vdata required for sensing becomes smaller.

Referring to FIG. 13, in the process before the product is shipped, the coarse sensing process S21 and the fine sensing process S22 may be performed successively so that the threshold voltage Vth of the driving element DR is sensed in each of the sub-pixels (S21, S22, and S23).

After the product of the display panel 100 is shipped, the coarse sensing and the fine sensing may be performed successively to sense the threshold voltage Vth of the driving element DR in each of the sub-pixels (S24, S25, and S26). The display device may modulate the pixel data with the compensation value that compensates for the threshold voltage Vth, which has been sensed, to compensate for the amount of the shift in the threshold voltage Vth of the driving element DR during the display time DT, thereby improving the image quality (S27).

Figure 14:
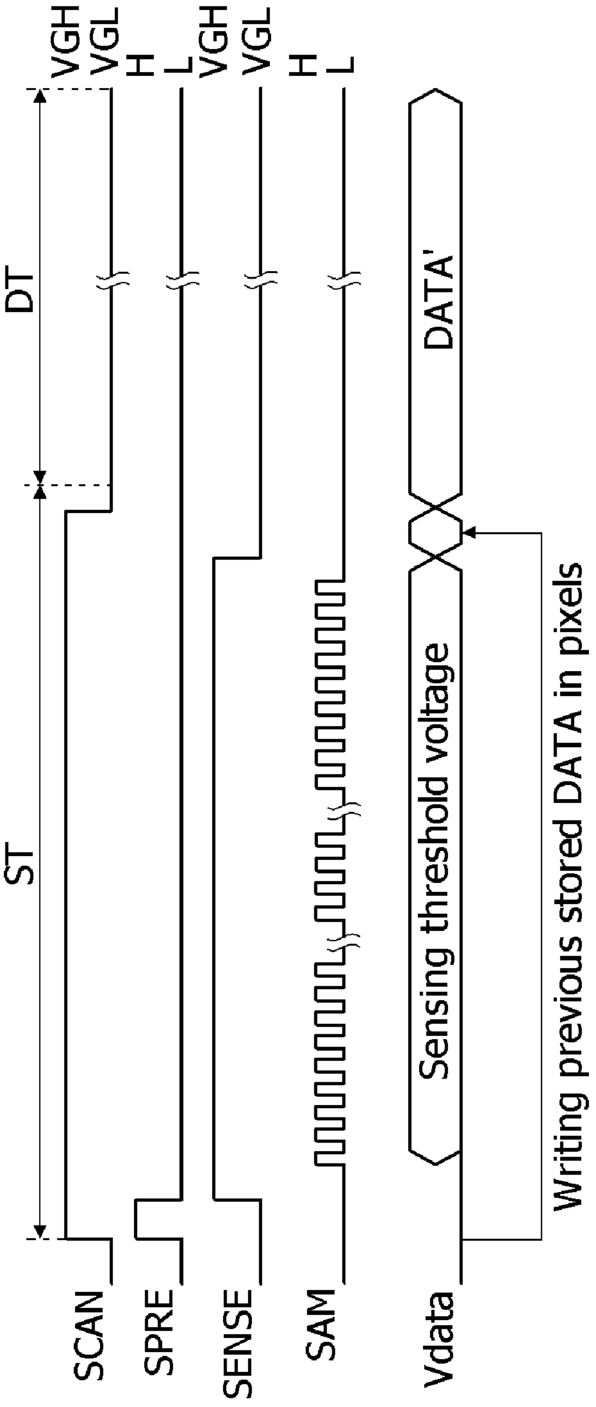
FIG. 14 is a diagram illustrating an example in which previous pixel data stored in memory are written to pixels after the sensing time is over and before the display time is resumed according to the embodiment of the present disclosure.

The threshold voltage Vth of the driving element DR may be sensed within the display time DT during which the pixels are driven. For example, since high-speed sensing is possible, the threshold voltage Vth of the driving element DR may be sensed in the vertical blank time VB before the active period AT is resumed within the display time shown in FIG. 2. In this case, the voltage charged in the pixels may be varied by the pulse of the data voltage Vdata. To prevent this, the timing controller 130 may store data written to the pixels in the memory and, as shown in FIG. 14, write previous data stored in the memory to the sub-pixels at which the threshold voltage Vth of the driving element DR has been sensed after the end of the sensing time ST and before the transition to the display time DT. The sub-pixels in which the previous data stored in the memory is written may be restored to the driving state before the sensing time ST.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A sensing circuit comprising:

a pixel circuit including a data line, a plurality of gate lines, and a driving element connected to a sensing line and configured to drive a light emitting element;

a data driver configured to output data voltage; and a gate driver configured to supply gate signals to the gate lines during a sensing time, wherein the pixel circuit further includes:

a first switch element connected between the data line and a first node, configured to be turned on in response to a gate high voltage of a first gate signal, and configured to be turned off when a voltage of the first gate signal is a gate low voltage;

a second switch element connected between the sensing line and a second node, configured to be turned on in response to the gate high voltage of a second gate signal, and configured to be turned off when the voltage of the second gate signal is the gate low voltage; and a capacitor connected between the first node and the second node, wherein the driving element includes a first electrode to which a pixel driving voltage is applied, a gate electrode connected to the first node, and a second electrode connected to the second node;

wherein the light emitting element includes an anode electrode connected to the second node and a cathode electrode to which a cathode voltage is applied;

wherein the data voltage is applied to the data lines and increased stepwise during the sensing time;

wherein the first gate signal includes a pulse of the gate high voltage generated during the sensing time;

the second gate signal includes a pulse of the gate high voltage generated during the sensing time;

during the sensing time, a voltage of the second gate signal rises to the gate high voltage after the voltage of the first gate signal is inverted to the gate high voltage; and during the sensing time, the voltage of the first gate signal lowers to the gate low voltage after the voltage of the second gate signal lowers to the gate low voltage.

2. The sensing circuit of claim 1, further comprising:

an analog-to-digital converter configured to convert a sensing voltage on the sensing line into digital data during the sensing time;

a third switch element connected between the sensing line and a constant voltage node to which a reference voltage is applied, configured to be turned on in response to a high voltage of a third gate signal, and configured to be turned off when the voltage of the third gate signal is a low voltage; and a fourth switch element connected between the sensing line and the analog-to-digital converter, configured to be turned on in response to a high voltage of a fourth gate signal, and configured to be turned off when the voltage of the fourth gate signal is a low voltage.

3. The sensing circuit of claim 2, wherein the third switch element is turned on prior to the second switch element.

4. The sensing circuit of claim 2, wherein the third gate signal includes a pulse of the high voltage generated during the sensing time;

the fourth gate signal includes a plurality of pulses of the high voltage generated during the sensing time, the voltage of the third gate signal rises to the high voltage when the voltage of the first gate signal changes to the gate high voltage, and is lowered to the low voltage when the voltage of the second gate signal changes to the gate low voltage; and the pulse of the fourth gate signal is repeatedly generated while the voltages of the first and second gate signals remain at the gate high voltage.

5. The sensing circuit of claim 4, wherein the data voltage includes a plurality of pulses whose voltage is increased stepwise by a preset voltage step difference during the sensing time; and a pulse of the fourth gate signal is generated subsequent to the pulse of the data voltage, and the pulse of the fourth gate signal and the pulse of the data voltage are alternated.

6. The sensing circuit of claim 1, wherein the sensing time includes a coarse sensing time and a fine sensing time, and wherein the data voltage includes:

a plurality of first pulses whose voltage is increased stepwise by a first voltage step difference during the coarse sensing time; and a plurality of second pulses whose voltage is increased stepwise by a second voltage step difference less than the first voltage step difference during the fine sensing time.

7. The sensing circuit of claim 6, wherein a threshold voltage of the driving element is sensed when the sensing voltage is greater than a predetermined threshold value;

a pulse voltage of the data voltage applied to the data line is set to an upper limit voltage of a fine sensing voltage range applicable to the fine sensing time when the sensing voltage is greater than the predetermined threshold; and the data voltage includes the plurality of second pulses whose voltage is increased stepwise by the second voltage step difference within the fine sensing voltage range during the fine sensing time.

8. The sensing circuit of claim 6, wherein the fine sensing time at least includes a first fine sensing time and a second fine sensing time, and wherein the data voltage includes:

the plurality of first pulses whose voltage is increased stepwise by a first voltage step difference during the coarse sensing time;

the plurality of second pulses whose voltage is increased stepwise by the second voltage step difference less than the first voltage step difference during the first fine sensing time; and a plurality of third pulses whose voltage is increased stepwise by a third voltage step difference less than the second voltage step difference during the second fine sensing time.

9. A display device comprising:

a display panel on which a plurality of data lines, a plurality of gate lines, a plurality of power lines, a plurality of sensing lines, and a plurality of pixel circuits including a drive element for driving a light emitting element are arranged;

a data driver configured to output data voltage to be applied to the data lines;

a gate driver configured to supply gate signals to the gate lines during a sensing time and a display time; and a sensing circuit including an analog-to-digital converter that converts sensing voltages on the sensing lines into digital data during the sensing time, wherein each of the pixel circuits further includes:

a first switch element connected between the data line and a first node, configured to be turned on in response to a gate high voltage of a first gate signal, and configured to be turned off when a voltage of the first gate signal is a gate low voltage;

a second switch element connected between the sensing line and a second node, configured to be turned on in response to the gate high voltage of a second gate signal, and configured to be turned off when the voltage of the second gate signal is the gate low voltage; and a capacitor connected between the first node and the second node, wherein the driving element includes a first electrode to which a pixel driving voltage is applied, a gate electrode connected to the first node, and a second electrode connected to the second node;

wherein the light emitting element includes an anode electrode connected to the second node and a cathode electrode to which a cathode voltage is applied;

wherein the data voltage is increased stepwise during the sensing time;

wherein the first gate signal includes a pulse of the gate high voltage generated during the sensing time;

the second gate signal includes a pulse of the gate high voltage generated during the sensing time;

during the sensing time, a voltage of the second gate signal rises to the gate high voltage after the voltage of the first gate signal is inverted to the gate high voltage; and during the sensing time, the voltage of the first gate signal lowers to the gate low voltage after the voltage of the second gate signal is lowered to the gate low voltage.

10. The display device of claim 9, wherein the sensing circuit further includes:

a third switch element connected between the sensing line and a constant voltage node to which a reference voltage is applied, configured to be turned on in response to a high voltage of a third gate signal, and configured to be turned off when the voltage of the third gate signal is a low voltage; and a fourth switch element connected between the sensing line and the analog-to-digital converter, configured to be turned on in response to a high voltage of a fourth gate signal, and configured to be turned off when the voltage of the fourth gate signal is a low voltage.

11. The display device of claim 10, wherein the third switch element is turned on prior to the second switch element.

12. The display device of claim 10, wherein:

the third gate signal includes a pulse of the high voltage generated during the sensing time;

the fourth gate signal includes a plurality of pulses of the high voltage generated during the sensing time;

the voltage of the third gate signal rises to the high voltage when the voltage of the first gate signal changes to the gate high voltage, and lowers to the low voltage when the voltage of the second gate signal changes to the gate low voltage; and the pulse of the fourth gate signal is repeatedly generated while the voltages of the first and second gate signals remain at the gate high voltage.

13. The display device of claim 10, wherein the data voltage includes a plurality of pulses whose voltage is increased stepwise by a preset voltage step difference during the sensing time; and a pulse of the fourth gate signal is generated subsequent to the pulse of the data voltage, and the pulse of the fourth gate signal and the pulse of the data voltage are alternated.

14. The display device of claim 9, wherein the sensing time includes a coarse sensing time and a fine sensing time, the data voltage includes a plurality of first pulses whose voltage is increased stepwise by a first voltage step difference during the coarse sensing time, the data voltage is increased stepwise by a second voltage step difference less than the first voltage step difference during the fine sensing time, and a threshold voltage of the driving element is sensed when the sensing voltage is greater than a predetermined threshold value.

15. The display device of claim 14, wherein, a pulse voltage of the data voltage applied to the data line is set to an upper limit voltage of a fine sensing voltage range applicable to the fine sensing time when the sensing voltage is greater than the predetermined threshold, and the data voltage includes a plurality of second pulses whose voltage is increased stepwise by the second voltage step difference within the fine-sensing voltage range during the fine sensing time.

16. The display device of claim 9, wherein the sensing time includes a coarse sensing time and a fine sensing time;

the fine sensing time at least includes a first fine sensing time and a second fine sensing time, and the data voltage includes:

a plurality of first pulses whose voltage is increased stepwise by a first voltage step difference during the coarse sensing time;

a plurality of second pulses whose voltage is increased stepwise by a second voltage step difference less than the first voltage step difference during the first fine sensing time; and a plurality of third pulses whose voltage is increased stepwise by a third voltage step difference less than the second voltage step difference during the second fine sensing time.

* * * * *